(12) United States Patent
Velingkar et al.

(10) Patent No.: US 8,793,567 B2
(45) Date of Patent: Jul. 29, 2014

(54) AUTOMATED SUGGESTED SUMMARIZATIONS OF DATA

(75) Inventors: Amit Velingkar, Redmond, WA (US); Weng Keong Peter Anthony Leong, Redmond, WA (US); Allan Folting, Redmond, WA (US); Carl Brenn Sutter, IV, Redmond, WA (US); Diego M. Oppenheimer, Seattle, WA (US); Stephen Van de Walker Handy, Bremerton, WA (US)

(73) Assignee: Microsoft Corporation, Redmond, WA (US)

( * ) Notice: Subject to any disclaimer, the term of this patent is extended or adjusted under 35 U.S.C. 154(b) by 229 days.

(21) Appl. No.: 13/298,285

(22) Filed: Nov. 16, 2011

(65) Prior Publication Data
US 2013/0124960 A1    May 16, 2013

(51) Int. Cl.
*G06F 17/20* (2006.01)

(52) U.S. Cl.
USPC ............................................. 715/220

(58) Field of Classification Search
CPC ..................................... G06F 17/246
USPC ......................................... 715/220
See application file for complete search history.

(56) References Cited

U.S. PATENT DOCUMENTS

| | | | |
|---|---|---|---|
| 5,495,565 A | 2/1996 | Millard et al. | |
| 5,581,677 A | 12/1996 | Myers et al. | |
| 5,844,572 A | 12/1998 | Schott | |
| 5,894,311 A | 4/1999 | Jackson | |
| 6,278,450 B1 | 8/2001 | Arcuri et al. | |
| 6,496,832 B2 | 12/2002 | Chi et al. | |
| 7,002,580 B1 | 2/2006 | Aggala et al. | |
| 7,092,929 B1 | 8/2006 | Dvorak et al. | |
| 7,107,519 B1 | 9/2006 | Webster et al. | |
| 7,127,672 B1 | 10/2006 | Patterson et al. | |
| 7,231,593 B1 | 6/2007 | Raja et al. | |
| 7,292,244 B2 | 11/2007 | Vafiadis et al. | |
| 7,565,608 B2 | 7/2009 | Faraday et al. | |
| 7,627,812 B2 | 12/2009 | Chamberlain et al. | |
| 7,849,395 B2 | 12/2010 | Ellis et al. | |
| 7,882,427 B2 | 2/2011 | Raja et al. | |
| 7,908,567 B1 | 3/2011 | Bhojan | |
| 7,949,953 B2 | 5/2011 | Bhatt et al. | |

(Continued)

FOREIGN PATENT DOCUMENTS

| | | | | |
|---|---|---|---|---|
| EP | 1286284 A1 | * | 2/2003 | ............ G06F 17/60 |
| JP | 2004-028864 A | | 1/2004 | |

OTHER PUBLICATIONS

Marinuzzi, John., "PowerPivot for Excel 2010", Retrieved at <<https://community.altiusconsulting.com/blogs/altiustechblog/archive/2011/05/04/powerpivot-for-excel-2010.aspx>>, May 4, 2011, pp. 5.

(Continued)

*Primary Examiner* — Frank D Mills
(74) *Attorney, Agent, or Firm* — Jim Ross; Micky Minhas

(57) ABSTRACT

Technologies are described herein for generating field sets of a data summary table. Multiple fields in a spreadsheet document are identified. Multiple field scores for each field of the plurality of fields are determined. A field set incorporating two or more of the plurality of fields is generated based on the plurality of field scores. The field set is inserted into the data summary table, thereby transforming the data summary table without the field set to the data summary table with the field set.

20 Claims, 8 Drawing Sheets

(56) References Cited

U.S. PATENT DOCUMENTS

| | | | |
|---|---|---|---|
| 8,255,789 B2 | 8/2012 | Berger et al. | |
| 8,612,380 B2 | 12/2013 | Kleppner et al. | |
| 2003/0071814 A1 | 4/2003 | Jou et al. | |
| 2003/0154443 A1 | 8/2003 | Papierniak et al. | |
| 2003/0195780 A1 | 10/2003 | Arora et al. | |
| 2004/0230471 A1 | 11/2004 | Putnam Brookes | |
| 2005/0071325 A1 | 3/2005 | Bem | |
| 2005/0204304 A1 | 9/2005 | Garcia et al. | |
| 2005/0234960 A1* | 10/2005 | Chickering et al. | 707/102 |
| 2006/0074866 A1 | 4/2006 | Chamberlain et al. | |
| 2006/0167911 A1* | 7/2006 | Le Cam | 707/101 |
| 2006/0218483 A1 | 9/2006 | Weitzman et al. | |
| 2006/0285868 A1 | 12/2006 | Holmes | |
| 2007/0024490 A1 | 2/2007 | Carter et al. | |
| 2007/0061369 A1* | 3/2007 | Folting et al. | 707/200 |
| 2007/0061611 A1 | 3/2007 | Mackinlay et al. | |
| 2007/0074130 A1* | 3/2007 | Folting et al. | 715/792 |
| 2007/0260970 A1 | 11/2007 | Dorwart | |
| 2008/0005677 A1 | 1/2008 | Thompson | |
| 2008/0082521 A1 | 4/2008 | Danielson et al. | |
| 2008/0243784 A1 | 10/2008 | Stading | |
| 2008/0288889 A1 | 11/2008 | Hunt et al. | |
| 2009/0044089 A1 | 2/2009 | Gur et al. | |
| 2009/0096812 A1 | 4/2009 | Boixel et al. | |
| 2009/0282324 A1* | 11/2009 | Patel | 715/212 |
| 2009/0287673 A1 | 11/2009 | Chronister et al. | |
| 2009/0307207 A1 | 12/2009 | Murray | |
| 2010/0017872 A1 | 1/2010 | Goertz | |
| 2010/0070448 A1 | 3/2010 | Omoigui | |
| 2010/0083086 A1* | 4/2010 | Berger et al. | 715/213 |
| 2010/0107101 A1 | 4/2010 | Shaw et al. | |
| 2010/0205521 A1* | 8/2010 | Folting | 715/227 |
| 2010/0214299 A1 | 8/2010 | Robertson et al. | |
| 2010/0228752 A1 | 9/2010 | Folting et al. | |
| 2010/0229122 A1 | 9/2010 | McCormack et al. | |
| 2011/0016425 A1 | 1/2011 | Homburg et al. | |
| 2011/0055722 A1 | 3/2011 | Ludwig | |
| 2011/0066488 A1 | 3/2011 | Ludewig et al. | |
| 2011/0087954 A1 | 4/2011 | Dickerman et al. | |
| 2011/0276867 A1* | 11/2011 | Machalek | 715/212 |
| 2011/0295871 A1* | 12/2011 | Folting et al. | 707/766 |
| 2012/0023101 A1* | 1/2012 | Heimendinger et al. | 707/737 |
| 2012/0159297 A1* | 6/2012 | Peters | 715/212 |
| 2012/0166927 A1* | 6/2012 | Shearer et al. | 715/212 |
| 2012/0192053 A1* | 7/2012 | Waltenberger | 715/227 |
| 2013/0080444 A1 | 3/2013 | Wakefield et al. | |
| 2013/0086459 A1* | 4/2013 | Folting et al. | 715/212 |
| 2013/0086460 A1* | 4/2013 | Folting et al. | 715/212 |
| 2013/0097177 A1 | 4/2013 | Fan et al. | |
| 2013/0124989 A1 | 5/2013 | Doan et al. | |
| 2013/0145244 A1 | 6/2013 | Rothschiller et al. | |

OTHER PUBLICATIONS

Doumont, et al., "Choosing the Right Graph", Retrieved at <<http://users.ece.gatech.edu/~gpalmer/ece8020/documents/PDF/Graphs.pdf>>, IEEE Transactions on Professional Communication, vol. 45, No. 1, Mar. 2002, pp. 1-6.

U.S. Official Action dated Oct. 22, 2012 in U.S. Appl. No. 13/245,126.

U.S. Official Action dated Oct. 24, 2012 in U.S. Appl. No. 13/272,522.

U.S. Official Action dated Apr. 15, 2013 in U.S. Appl. No. 13/272,522.

U.S. Official Action dated Mar. 19, 2013 in U.S. Appl. No. 13/311,541.

International Search Report dated Feb. 26, 2013 in International Application No. PCT/US12/066489.

International Search Report dated Feb. 28, 2013 in International Application No. PCT/US12/057159.

Jones, "Document Assembly Solution for SpreadsheetML", Retrieved at http://blogs.msdn.com/b/brian.Jones/archive/2008/11/04/document-assembly-solution-for-spreadsheetml.aspx, Nov. 4, 2008, pp. 11.

OLAP Statistics & Reporting, Retrieved: Sep. 2, 2011, http://www.assistmyteam.nel/OLAPStatistics/, 4 pgs.

"Chart Component .NET veT. 4.4," Printed: Jul. 27, 2011, available at http://www.chartcomponent.comi, 1 pg.

Klass. Presenting Data: Tabular and graphic display of social indicators. "Constructing Good Charts and Graphs" Printed Jul. 27, 2011, available at http://lilt.ilstu.edu!gmklass/pos138/datadisplay/ sections/ goodcharts.htm, 28pgs.

Helfman et al., "Selecting the Best Graph Based on Data, Tasks, and User Roles." Jun. 11-15, 2007. http://www.upassoc.org/usabilityresources/conference12007/prp 049.pdf, 10 pgs.

Wikipedia. "Wikipedia talk:Collaboration to convert graphs to SVG" Printed: Jul. 27, 2011, http://en.wikipedia.org/wiki/Wikipedia_talk:Collaboration_to convert_graphs to SVG#AAutomati_charts, 6pgs.

Ani Gupta (nickname: Soan), "Excel Chart Advisor will Create and Suggest Charts for your Data," published on May 29, 2010, available at: htt12:/iam22tcch.comis!22iBlogs/Dosti20 1 O/OS!29iExcc1-Chart-advisor-will-create-and-suggest-charts-ror-vour-data.aspx, 4 pgs.

U.S. Official Action dated Jun. 11, 2013 in U.S. Appl. No. 13/245,126.

U.S. Official Action dated Sep. 6, 2013 in U.S. Appl. No. 13/311,541.

U.S. Official Action dated Sep. 26, 2013 in U.S. Appl. No. 13/272,522.

U.S. Official Action dated Feb. 13, 2014 in U.S. Appl. No. 13/298,288.

U.S. Official Action dated Mar. 12, 2014 in U.S. Appl. No. 13/272,522.

* cited by examiner

| SALE ID 302 | DATE 304 | CUSTOMER 306 | PRODUCT 308 | QTY 310 | PRICE 312 | FRUIT 314 | FARM 316 | ORGANIC 318 |
|---|---|---|---|---|---|---|---|---|
| 1 | 1/4/2011 | DAVE | RED DELICIOUS | 15 | $180.00 | APPLE | BERRY | TRUE |
| 2 | 1/4/2011 | CATHY | LEMON | 16 | $240.00 | CITRUS | KEY FARMS | FALSE |
| 3 | 1/4/2011 | DAVE | HAWAII YELLOW | 7 | $140.00 | BANANA | LANAI PLANTATIONS | FALSE |
| 4 | 1/5/2011 | ELLEN | IVY CRUNCH | 5 | $60.00 | PEAR | BERRY | TRUE |
| 5 | 1/5/2011 | ADAM | IVY CRUNCH | 20 | $380.00 | PEAR | BERRY | FALSE |
| 6 | 1/5/2011 | CATHY | LEMON | 7 | $98.00 | CITRUS | KEY FARMS | FALSE |
| 7 | 1/5/2011 | BARRY | HAWAII YELLOW | 13 | $247.00 | BANANA | LANAI PLANTATIONS | FALSE |
| 8 | 1/6/2011 | BARRY | RED DELICIOUS | 11 | $209.00 | APPLE | BERRY | TRUE |
| 9 | 1/6/2011 | CATHY | MANDARIN ORANGE | 18 | $324.00 | CITRUS | KEY FARMS | FALSE |
| 10 | 1/6/2011 | ADAM | RED DELICIOUS | 6 | $108.00 | APPLE | BERRY | TRUE |
| 11 | 1/6/2011 | ADAM | GRANNY GREEN | 5 | $80.00 | APPLE | KNOTT | FALSE |
| 12 | 1/6/2011 | DAVE | IVY CRUNCH | 17 | $221.00 | PEAR | BERRY | TRUE |
| 13 | 1/7/2011 | CATHY | IVY CRUNCH | 1 | $12.00 | PEAR | BERRY | TRUE |
| 14 | 1/7/2011 | DAVE | IVY CRUNCH | 15 | $180.00 | PEAR | BERRY | TRUE |
| 15 | 1/8/2011 | DAVE | GRANNY GREEN | 11 | $165.00 | APPLE | KNOTT | FALSE |
| 16 | 1/9/2011 | BARRY | MANDARIN ORANGE | 16 | $224.00 | CITRUS | KEY FARMS | FALSE |
| 17 | 1/10/2011 | BARRY | PLANTAIN | 15 | $300.00 | BANANA | LANAI PLANTATIONS | FALSE |
| 18 | 1/11/2011 | CATHY | MANDARIN ORANGE | 13 | $169.00 | CITRUS | KEY FARMS | FALSE |
| 19 | 1/12/2011 | ADAM | PLANTAIN | 15 | $225.00 | BANANA | LANAI PLANTATIONS | FALSE |
| 20 | 1/13/2011 | BARRY | GRANNY GREEN | 9 | $144.00 | APPLE | KNOTT | FALSE |

Fig. 3

TABLE 402A

| ROW SCORE 404 | COLUMN SCORE 406 | SUM SCORE 408 | COUNT SCORE 410 | AVERAGE SCORE 412 |
|---|---|---|---|---|
| +50.00 (CUSTOMER) | +40.00 (ORGANIC) | +30.00 (QTY) | +30.00 (SALE ID) | |
| +50.00 (FRUIT) | +30.00 (DATE) | +30.00 (PRICE) | | |
| +50.00 (FARM) | +20.00 (CUSTOMER) | +10.00 (SALE ID) | | |
| +30.00 (PRODUCT) | +20.00 (FRUIT) | | | |
| +10.00 (ORGANIC) | +20.00 (FARM) | | | |

FIRST POTENTIAL FIELD SET 414A

| ROW LABELS | | SUM OF QTY 418 | |
|---|---|---|---|
| ADAM | 416A | 420A | 84 |
| BARRY | 416B | 420B | 74 |
| CATHY | 416C | 420C | 73 |
| DAVE | 416D | 420D | 78 |
| ELLEN | 416E | 420E | 44 |
| 422 | GRAND TOTAL | | 353 |

TABLE 402B

| ROW SCORE 404 | COLUMN SCORE 406 | SUM SCORE 408 | COUNT SCORE 410 | AVERAGE SCORE 412 |
|---|---|---|---|---|
| +37.00 (CUSTOMER) | +40.00 (ORGANIC) | +22.00 (QTY) | +30.00 (SALE ID) | |
| +50.00 (FRUIT) | +30.00 (DATE) | +30.00 (PRICE) | | |
| +50.00 (FARM) | +20.00 (CUSTOMER) | +10.00 (SALE ID) | | |
| +30.00 (PRODUCT) | +20.00 (FRUIT) | | | |
| +10.00 (ORGANIC) | +20.00 (FARM) | | | |

SECOND POTENTIAL FIELD SET 414B

| ROW LABELS | | SUM OF PRICE 426 | |
|---|---|---|---|
| APPLE | 424A | 428A | 1266 |
| BANANA | 424B | 428B | 1522 |
| CITRUS | 424C | 428C | 1490 |
| PEAR | 424D | 428D | 1315 |
| GRAND TOTAL | | | 5593 |

430

TABLE 402C

| ROW SCORE 404 | COLUMN SCORE 406 | SUM SCORE 408 | COUNT SCORE 410 | AVERAGE SCORE 412 |
|---|---|---|---|---|
| +37.00 (CUSTOMER) | +40.00 (ORGANIC) | +22.00 (QTY) | +30.00 (SALE ID) | |
| +37.00 (FRUIT) | +30.00 (DATE) | +22.00 (PRICE) | | |
| +50.00 (FARM) | +20.00 (CUSTOMER) | +10.00 (SALE ID) | | |
| +30.00 (PRODUCT) | +20.00 (FRUIT) | | | |
| +10.00 (ORGANIC) | +20.00 (FARM) | | | |

THIRD POTENTIAL FIELD SET 414C

| ROW LABELS | COUNT OF SALE ID 434 |
|---|---|
| BERRY 432A | 436A   10 |
| KEY FARMS 432B | 436B   8 |
| KNOTT 432C | 436C   5 |
| LANAI PLANTATIONS 432D | 436D   7 |
| 438   GRAND TOTAL | 30 |

TABLE 402D

| ROW SCORE 404 | COLUMN SCORE 406 | SUM SCORE 408 | COUNT SCORE 410 | AVERAGE SCORE 412 |
|---|---|---|---|---|
| +37.00 (CUSTOMER) | +40.00 (ORGANIC) | +22.00 (QTY) | +22.00 (SALE ID) | |
| +37.00 (FRUIT) | +30.00 (DATE) | +22.00 (PRICE) | | |
| +37.00 (FARM) | +20.00 (CUSTOMER) | +10.00 (SALE ID) | | |
| +30.00 (PRODUCT) | +20.00 (FRUIT) | | | |
| +10.00 (ORGANIC) | +20.00 (FARM) | | | |

FOURTH POTENTIAL FIELD SET 414D

| ROW LABELS | FALSE 442A | TRUE 442B | GRAND TOTAL 444 |
|---|---|---|---|
| ADAM 440A | 446A 58 | 448A 26 | 450A 84 |
| BARRY 440B | 446B 63 | 448B 11 | 450B 74 |
| CATHY 440C | 446C 72 | 448C 1 | 450C 73 |
| DAVE 440D | 446D 18 | 448D 60 | 450D 78 |
| ELLEN 440E | 446E 20 | 448E 24 | 450E 44 |
| GRAND TOTAL 452 | 231 | 122 | 353 |

AUTOMATED SUGGESTED SUMMARIZATIONS OF DATA

BACKGROUND

Data summary tables can be used to analyze large amounts of data. One example of a data summary table is a pivot table. A data summary table provides an efficient way to display and summarize data that is supplied by a database program or that is in a data listing of a spreadsheet document. A user can select fields of the data to include within a page, row, column, or data regions of the data summary table. The user can also choose parameters, such as the sum, variance, count, and standard deviation, to be displayed for selected data fields. Data in a database or other external data sources that can be queried from within a spreadsheet program, as well as spreadsheet data including lists, can be analyzed in a data summary table.

Although a data summary table is designed so that data can be efficiently and intuitively analyzed, creation of the data summary table itself can be challenging, especially for novice users. Conventional tools for creating data summary tables essentially provide a user with a blank report. The user is then responsible for populating the blank report with a desired set of fields, such as a row field, a column field, and a set field. While such tools can provide an advanced user with greater flexibility, a novice user who does not have a deep understanding of the underlying data set may have difficulty determining the relevant content to include in the data summary table.

It is with respect to these considerations and others that the disclosure made herein is presented.

SUMMARY

Technologies are described herein for generating field sets of a data summary table. A spreadsheet document may include multiple fields. A suggestion module may be adapted to analyze each field and determine a set of individual field scores for each field. Each set of individual field scores may be adjusted based on user selection of the corresponding field. The suggestion module may also be adapted to generate a field set based on the individual field scores. The field set may include one or more row labels and one or more columns, each of which can represent one or more value fields and/or one or more column fields. Each cell arranged under the value column may contain a computation result of some mathematical function and correspond to one of the row labels. A hierarchical mapping may determine an order of the row labels. The suggestion module may further be adapted to perform a quality check on the field set and discard the field set if the quality check fails.

In some example technologies, a method is adapted to generate field sets of a data summary table. According to the method, technologies may identify a plurality of fields in a spreadsheet document. The fields may be represented as columns in the spreadsheet document. The technologies may determine a plurality of field scores for each field of the plurality of fields. The technologies may also generate a field set incorporating two or more of the plurality of fields based on the plurality of field scores. The technologies may further insert the field set into the data summary table, thereby transforming the data summary table without the field set to the data summary table with the field set.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a screen display diagram illustrating a portion of an example spreadsheet document, in accordance with some embodiments;

DETAILED DESCRIPTION

Figure 1:
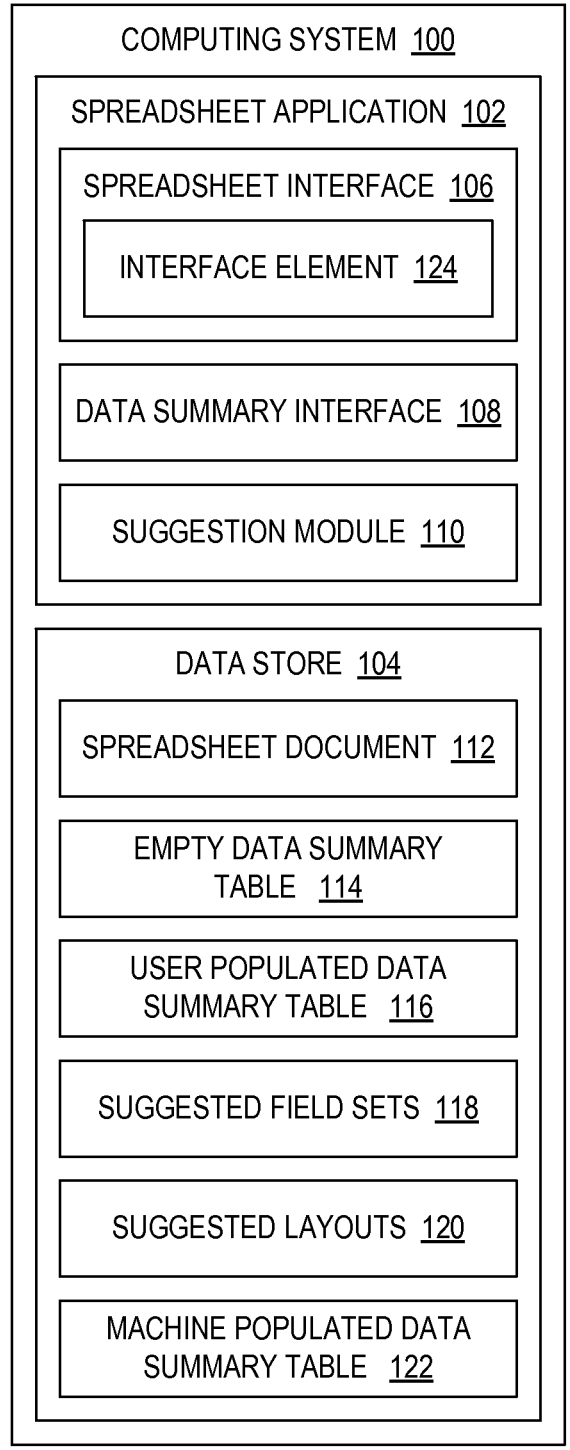
FIG. 1 is a block diagram illustrating an example computing system adapted to generate field sets of a data summary table, in accordance with some embodiments.

The following detailed description is directed to technologies for generating field sets of a data summary table. A spreadsheet application may be adapted to display a spreadsheet document containing a visual arrangement of a raw data set. More specifically, the spreadsheet document may visually arrange the raw data set into a two-dimensional matrix containing multiple fields (e.g., columns) and multiple records (e.g., rows). The spreadsheet application may include a data summary interface that enables a user to generate a data summary table, such as a pivot table, representing a summary of at least a portion of the raw data set. The data summary table may extract, organize, and summarize the raw data into a user-friendly report. Accordingly, the data summary table can enable the user to more intuitively analyze the data, make comparisons, detect patterns and relationships, and/or discover trends. The data summary table may also be more conducive to generating charts and other graphical representations of the data.

In some implementations, when the user initiates the creation of the data summary table, the data summary interface may be configured to provide the user with an empty data summary table. The data summary interface may also be configured to provide multiple suggested field sets that the user can then insert into the data summary table. A suggestion module may be configured to generate the suggested field sets by analyzing fields of the spreadsheet. In this way, the user can populate the data summary table by simply selecting one or more of the suggested field sets. Through the suggested field sets, a novice user can easily generate the data summary table without a deep understanding of the raw data set. Additionally, a novice user can easily generate the data summary table without a deep understanding of the data summary table feature since the data summary interface can suggest summaries that are relevant and already created. Further, the suggested field sets may include one or more field sets that an advanced user might not have considered without these suggestions. As a result, the suggested field sets may shed new insight into the raw data set even for advanced users.

In some other implementations, when the user initiates the creation of the data summary table, the data summary interface may be configured to provide the user with multiple suggested layouts of the data summary table. Each suggested layout may include one or more of the suggested field sets. In this case, the user can simply select one of the suggested layouts without having to manually populate an empty data summary table. When the user selects a suggested layout, the user can then modify the suggested layout, if desired, by adding additional field sets and/or removing existing field sets.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, a computing system and methodology for providing suggestions for content in a data summary table is presented. FIG. 1 is a block diagram illustrating an example computing system 100 adapted to generate field sets of a data summary table, in accordance with at least some embodiments. The computing system 100 may include a spreadsheet application 102 and a data store 104. The spreadsheet application 102 may include a spreadsheet interface 106, a data summary interface 108, and a suggestion module 110. The spreadsheet interface 106 may be adapted to display a spreadsheet document 112. The data summary interface 108 may be adapted to display an empty data summary table 114, a user populated data summary table 116, suggested field sets 118, suggested layouts 120, and a machine populated data summary table 122.

A user may utilize the spreadsheet interface 106 to view the spreadsheet document 112. The spreadsheet document 112 may contain a visual arrangement of an underlying data set. More specifically, the spreadsheet document 112 may arrange the data set into a two-dimensional matrix containing multiple rows and multiple columns, according to some embodiments. In other embodiments, the spreadsheet document 112 may arrange the data set in a crosstab layout or a data summary table. In a common implementation, each column may represent a field, which defines a category of data. Each column may include multiple cells, each of which corresponds to one of the rows. Each cell may contain a value associated with the corresponding category of data. The values along each row may represent a distinct record of data. Each record may express a relationship between values from multiple columns.

For example, an illustrative data set may include sales data. In this case, an illustrative spreadsheet document may include a "date" column, a "customer name" column, and a "product" column. The "date" column may include a first cell containing a first value representing a first date and a second cell containing a second value representing a second date. The "customer name" column may include a third cell containing a third value representing a first customer name and a fourth cell containing a fourth value representing a second customer name. The "product" column may include a fifth cell containing a fifth value representing a first product name and a sixth cell containing a sixth value representing a second product name. In this example, the first cell, the third cell, and the fifth cell may be arranged along a first row. Thus, the first row may represent a first record containing the first value, the third value, and the fifth value. Similarly, the second cell, the fourth cell, and the sixth cell may be arranged along a second row. Thus, the second row may represent a second record containing the second value, the fourth value, and the sixth value. Additional columns may each represent additional fields, and additional rows may each represent additional records.

The spreadsheet document 112 may display raw data from the data set. As used herein, "raw data" may refer to collected data values that have yet to be processed (e.g., analyzed, summarized, etc.). In the previous example, as additional sales are made and recorded, such sales may be included in the data set and subsequently reflected in the spreadsheet document 112 as a new record. In cases where there are few records, a user might be able to interpret the raw data contained in the spreadsheet document 112 without help. However, in cases where there are hundreds of, thousands of, or even more records, the user may not be able to intuitively interpret the raw data contained in the spreadsheet document 112. In such cases, the user may generate a data summary table, such as a pivot table.

The data summary table may summarize the data contained in the spreadsheet document 112. More specifically, the data summary table may include one or more field sets. Each field set may be a two-dimensional matrix that includes one or more row labels and one or more columns, each of which can represent one or more value fields and/or one or more column fields. For purposes of clarity and illustration, a column in the field set representing a value field may also be referred to herein as a "value column." Similarly, a column in the field set representing a column field may also be referred to herein as a "summary column."

Each value column may represent a mathematical function with respect to a given column in the spreadsheet document. Each value column may include multiple cells (hereinafter referred to as summary cells), each of which corresponds to one of the row labels. Each summary cell may contain a computation result of the mathematical function with respect to the corresponding row label. Each summary column may correspond to a particular column label, which also corresponds to a column in the spreadsheet document. Each summary column may include additional summary cells, each of which contains a computation result of the mathematical function for a subset of data identified by the corresponding column label. Although embodiments described herein primarily describe the data summary table as containing value columns representing mathematical functions, it should be appreciated that the data summary table may also contain value rows representing mathematical functions.

Although some examples of the data summary table described herein contain a single value column, it should be appreciated that other implementations of the data summary table may contain multiple value columns, each of which may represent a different mathematical function. For example, multiple value columns may represent a single mathematical function. Some examples of value columns may include a sum column, an average column, a count column, and a standard deviation column. The sum column may include summary cells that contain computation results of a sum function. The average column may include summary cells that contain computation results of an average function. The count column may include summary cells that contain computation results of a count function. The standard deviation column may include summary cells that contain computation results of a standard deviation function.

Each field in the spreadsheet document 112 can be a candidate to represent the row labels and one or more columns of a field set. For example, an illustrative spreadsheet document may specify multiple sales transactions, where each sales transaction corresponds to one of multiple rows. Each transaction may refer to a sale of some quantity of a fruit. For each transaction, the spreadsheet document may include a "customer name" field identifying a customer name, a "fruit" field identifying a type of the fruit sold to the customer, a "quantity" field identifying a quantity of the fruit sold to the customer, and a "price" field identifying a price of the fruit sold to the customer.

In this example, an illustrative field set may include multiple row labels corresponding to the "customer name" field. Each row label may specify a unique customer name. The illustrative field set may include one or more columns. The columns may include value columns representing value fields. Some example value columns may include a quantity sum column corresponding to the "quantity" field and/or a price sum column corresponding to the "price" field. The quantity sum column may include summary cells that contain computation results specifying a total quantity of fruit sold to each customer. In particular, each summary cell in the quantity sum column may contain a computation result specifying the total quantity of fruit sold to the customer associated with the customer name in the corresponding row label.

The price sum column may include summary cells that contain computation results specifying a total amount of money spent by each customer purchasing fruit. In particular, each summary cell in the price sum column may contain a computation result specifying the total amount of money spent by the customer associated with the customer name in the corresponding row label. Here, through the quantity sum column and the price sum column, the illustrative field set may effectively aggregate data from the spreadsheet document 112. This can be particularly helpful when the spreadsheet document 112 contains hundreds of, thousands of, or even more transactions where the customer names and/or the fruits are frequently repeated.

The columns may also include one or more summary columns in addition to the value columns. In one example, the summary columns may correspond to the "fruit" field, which specifies a type of the fruit sold to the customer. Thus, a first summary column may correspond to an "apple" column label, a second summary column may correspond to an "orange" column label, a third summary column may correspond to a "watermelon" column label, and so forth. The first summary column may include summary cells that contain computation results specifying the total quantity of apples sold to the customers. In particular, each summary cell in the first summary column may contain a computation result specifying the total quantity of apples sold to the customer associated with the customer name in the corresponding row label.

The second summary column may include summary cells that contain computation results specifying the total quantity of oranges sold to the customers. In particular, each summary cell in the second summary column may contain a computation result specifying the total quantity of oranges sold to the customer associated with the customer name in the corresponding row label. The third summary column may include summary cells that contain computation results specifying the total quantity of watermelons sold to the customers. In particular, each summary cell in the third summary column may contain a computation result specifying the total quantity of watermelons sold to the customer associated with the customer name in the corresponding row label. Here, through the multiple summary columns, the illustrative field set may effectively break down the aggregated data (e.g., total quantity of fruit sold) displayed in the value column by various column labels (e.g., total quantity of apples sold, total quantity of oranges sold, total quantity of watermelons sold, etc.).

The spreadsheet interface 106 may enable a user to initiate the data summary interface 108. In an illustrative implementation, the spreadsheet interface 106 may include an interface element 124, which, when selected by the user, launches the data summary interface 108. For example, the interface element 124 may be a button arranged on a menu, tab, ribbon, or other suitable user interface. When the user initiates the data summary interface 108, the suggestion module 110 may generate the suggested field sets 118 in accordance with a suitable field set generation process. Additional details regarding the field set generation process is described in greater detail below with respect to FIG. 2. When the suggestion module 110 generates the suggested field sets 118, the data summary interface 108 may provide the suggested field sets 118 to the user in various ways.

In some embodiments, the data summary interface 108 may display the empty data summary table 114 and provide a list containing the suggested field sets 118. The user can then select one or more of the suggested field sets 118 for insertion into the empty data summary table 114. The data summary interface 108 may generate the user populated data summary table 116 by inserting the selected field sets into the empty data summary table 114. That is, the empty data summary table 114 may be transformed into the user populated data summary table 116. Through the suggested field sets 118, a novice user who does not have a deep understanding of the data set in the spreadsheet document 112 may be able to generate and populate a data summary table. Even for an advanced user, the suggested field sets 118 may contain field sets that the advanced user might not have considered without the suggestions.

In some other embodiments, the suggestion module 110 may generate the suggested layouts 120 of the data summary table. Each of the suggested layouts 120 may include one or more of the suggested field sets 118. The data summary interface 108 may display a list containing the suggested layouts 120. The user can then select one of the suggested layouts 120. The data summary interface 108 may generate the machine populated data summary table 122 corresponding to the selected layout. That is, the machine populated data summary table 122 may be transformed from a data summary table without one or more of the suggested field sets 118 into a data summary table with one or more of the suggested field sets 118. Through the suggested layouts 120, a user can generate a prepopulated data summary table without having to start from the empty data summary table 114. Instead, the user can start from the machine populated data summary table 122 corresponding to one of the suggested layouts 120. The user can then modify the machine populated data summary table 122 as desired.

Figure 2:
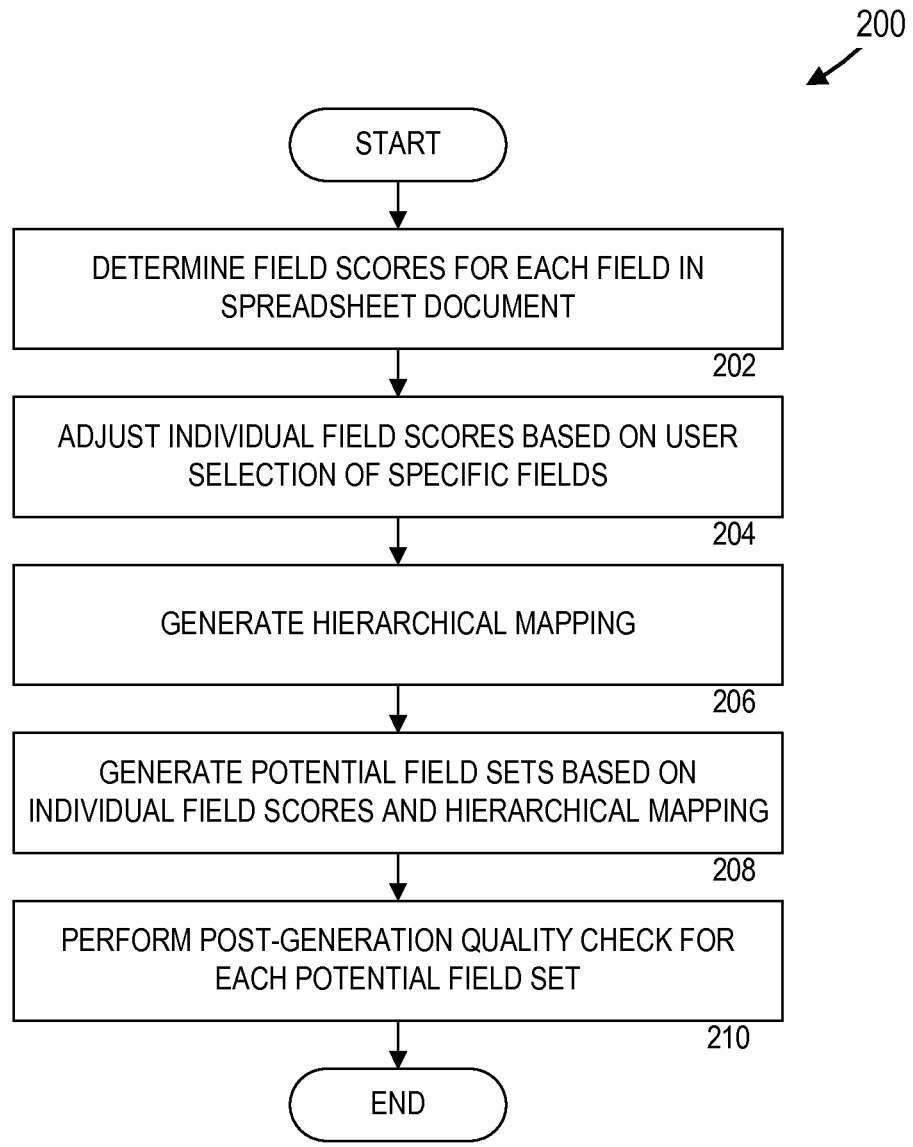
FIG. 2 is a flow diagram illustrating an example method for generating suggested field sets, in accordance with some embodiments.

Referring now to FIG. 2, additional details regarding the operation of the suggestion module 110 will be provided. FIG. 2 is a flow diagram illustrating an example method for generating the suggested field sets 118, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 2, a routine 200 begins at operation 202, where the suggestion module 110 determines individual field scores for each field in the spreadsheet document 112. In some embodiments, the field scores may include a row score, a column score, and one more value scores. Each value score may represent a mathematical function, such as a sum function, an average function, a count function, or a standard deviation function. For example, a sum score may correspond to the sum function, and an average score may correspond to the average function. Similarly, a count score may correspond to the count function, and a standard deviation score may correspond to the standard deviation function. Other types of value scores representing other mathematical functions may also be contemplated by one skilled in the art.

A higher row score may indicate that the field is a better candidate to represent row labels of a field set, while a lower row score may indicate that the field is a worse candidate to represent row labels in a field set. A higher column score may indicate that the field is a better candidate to represent column labels in a field set, while a lower column score may indicate that the field is a worse candidate to represent column labels in a field set. A higher value score may indicate that the field is a better candidate to represent a particular value column in a field set, while a lower value score may indicate that the field is a worse candidate to represent the particular value column in the field set.

In a first example, a higher sum score may indicate that the field is a better candidate to represent a sum column in a field set, while a lower sum score may indicate that the field is a worse candidate to represent the sum column in the field set. In a second example, a higher count score may indicate that the field is a better candidate to represent a count column in a field set, while a lower count score may indicate that the field is a worse candidate to represent the count column in the field set. In a third example, a higher average score may indicate that the field is a better candidate to represent an average column in a field set, while a lower average score may indicate that the field is a worse candidate to represent the average column in the field set. In a fourth example, a higher standard deviation score may indicate that the field is a better candidate to represent an standard deviation column in a field set, while a lower standard deviation score may indicate that the field is a worse candidate to represent the standard deviation column in the field set.

The suggestion module 110 may initially set the field scores as zero points for each field. For example, the suggestion module 110 may initially set the row score, the column score, the sum score, the count score, the average score, and the standard deviation score as zero points for each field. The suggestion module 110 may then increase and/or decrease the each field score based on various factors. Some example factors, including the number of empty cells, the data types of values, the frequency of unique values, and keyword matching, will be described below. The suggestion module 110 may be adapted to generate the various field scores by implementing one or more of these examples.

In a first implementation, the suggestion module 110 may adjust the field scores based on a number of empty cells under the field. In particular, the suggestion module 110 may decrease the field scores based on the number of empty cells under the field. For example, if the number of empty cells is less than about ten percent of the total number of cells under the field, then the suggestion module 110 may keep the field score unchanged. If the number of empty cells is between about ten and twenty percent of the total number of cells, then the suggestion module 110 may reduce the field score by a first amount (e.g., ten points). If the number of empty cells is between about twenty and fifty percent of the total number of cells, then the suggestion module 110 may reduce the field score by a second amount (e.g., twenty points). If the number of empty cells is greater than about fifty percent of the total number of cells, then the suggestion module 110 may reduce the field score by a third amount (e.g., thirty points).

In a second implementation, the suggestion module 110 may adjust the field scores based on the data type of the values under the field. For example, if the data type of the values under the field is a number with decimals, then the suggestion module 110 may reduce the row score and the column score by some amount (e.g., twenty points) and increase the sum score by some amount (e.g., thirty points). If the data type of the values under the field is currency, then the suggestion module 110 may reduce the row score and the column score by some amount (e.g., twenty points) and increase the sum score by some amount (e.g., thirty points). If the data type of the values under the field is a non-currency accounting value, then the suggestion module 110 may reduce the row score and the column score by some amount (e.g., twenty points) and increase the sum score by some amount (e.g., thirty points).

If the data type of the values under the field is a date, then the suggestion module 110 may reduce the row score by some amount (e.g., ten points), increase the column score by some amount (e.g., twenty points), and decrease the value scores by some amount (e.g., ten points). If the data type of the values under the field is a time, then the suggestion module 110 may reduce the row score by some amount (e.g., ten points), increase the column score by some amount (e.g., twenty points), and decrease the value scores by some amount (e.g., ten points).

If the data type of the values under the field is a percentage, then the suggestion module 110 may decrease the row score and the column score by some amount (e.g., twenty points) and increase the average score by some amount (e.g., twenty points). If the data type of the values under the field is a fraction, then the suggestion module 110 may decrease the row score and the column score by some amount (e.g., fifty points) and increase the average score by some amount (e.g., ten points). If the data type of the values under the field is a scientific value, then the suggestion module 110 may decrease the row score and the column score by some amount (e.g., fifty points) and increase the average score by some amount (e.g., ten points).

If the data type of the values under the field is text, then the suggestion module 110 may adjust the field scores based on the number of unique values under the field. If there is only a single unique value, then the suggestion module 110 may automatically reject the field. If the number of unique values under the field constitute less than about one percent of the total number of cells under the field, then the suggestion module 110 may increase the row score by some amount (e.g., ten points), increase the column score by some amount (e.g., forty points), and decrease the value scores by some amount (e.g., fifty points). If the number of unique values under the field constitute between about one percent and three percent of the total number of cells under the field, then the suggestion module 110 may increase the row score by some amount (e.g., fifty points), increase the column score by some amount (e.g., twenty points), and decrease the value scores by some amount (e.g., twenty points).

If the number of unique values under the field constitute between about three percent and six percent of the total number of cells under the field, then the suggestion module 110 may increase the row score by some amount (e.g., thirty points), increase the column score by some amount (e.g., ten points), and decrease the value scores by some amount (e.g., ten points). If the number of unique values under the field constitute between about six percent and ten percent of the total number of cells under the field, then the suggestion module 110 may increase the row score by some amount (e.g., twenty points) and increase the count score by some amount (e.g., five points). If the number of unique values under the field constitute between about ten percent and twenty percent of the total number of cells under the field, then the suggestion module 110 may increase the row score by some amount (e.g., ten points), decrease the column score about some amount (e.g., twenty points), and increase the count score by some amount (e.g., ten points). If the number of unique values under the field constitute greater than about twenty percent of the total number of cells under the field, then the suggestion module 110 may decrease the row score by some amount (e.g., fifty points), decrease the column score about some amount (e.g., fifty points), and increase the count score by some amount (e.g., twenty points).

If the number of unique values under the field constitute between about ten percent and twenty percent of the total number of cells under the field, then the suggestion module 110 may increase the row score by some amount (e.g., twenty points) and increase the count score by some amount (e.g., five points). If the number of unique values under the field constitute greater than about twenty percent of the total number of cells under the field, then the suggestion module 110 may increase the row score by some amount (e.g., thirty points), increase the column score by some amount (e.g., ten points), and decrease the value scores by some amount (e.g., ten points).

If the data type of the values under the field is integer, then the suggestion module 110 may adjust the field scores based on the number of unique values under the field. If there is only a single unique value, then the suggestion module 110 may automatically reject the field. If the number of unique values under the field constitute less than about one percent of the total number of cells under the field, then the suggestion module 110 may increase the column score by some amount (e.g., twenty points), increase the sum score by some amount (e.g., ten points), and decrease the count score by some amount (e.g., fifty points). If the number of unique values under the field constitute between about one percent and three percent of the total number of cells under the field, then the suggestion module 110 may increase the row score by some amount (e.g., twenty points), increase the column score by some amount (e.g., ten points), increase the sum score by some amount (e.g., twenty points), and decrease the county score by some amount (e.g., twenty points). If the number of unique values under the field constitute between about three percent and six percent of the total number of cells under the field, then the suggestion module 110 may increase the row score by some amount (e.g., ten points), increase the sum score by some amount (e.g., twenty points), and decrease the count score by some amount (e.g., ten points).

If the number of unique values under the field constitute greater than about six percent of the total number of cells under the field, then the suggestion module 110 may decrease the row score by some amount (e.g., twenty points) and decrease the column score by some amount of points (e.g., twenty points). The suggestion module 110 may also determine whether the integer values are identifiers. The integer values may be identifiers when about 99% of the integer values are unique.

In some embodiments, the suggestion module 110 may perform an additional check to further verify whether the integer values may be identifiers. In particular, the suggestion module 110 may determine whether the field name contains (not case-sensitive) a keyword that is associated with identifiers. Some example keywords may include "id", "identifier", "num", and "number". The field name may "contain" the keyword when the keyword is not preceded or followed by a non-blank character. For example, a field name "paid" will be considered to not contain the keyword "id".

If the integer values are determined to be identifiers, then the suggestion module 110 may also decrease the sum score by some amount (e.g., ten points) and increase the count score by some amount (e.g., thirty points). If the values are determined to not be identifiers, then the suggestion module 110 may increase the sum score by some amount (e.g., thirty points) and decrease the count score by some amount (e.g., ten points).

In a third implementation, the suggestion module 110 may adjust the field scores based on keyword matching. Keyword matching may occur when the name of the field defined in the field header matches a predefined keyword. For example, if the name of the field matches the keywords "revenue", "profit", "total", or "subtotal", then the suggestion module 110 may decrease the row score and the column score by some amount (e.g., ten points) and increase the value scores by some amount ten points). If the name of the field matches the keywords "region" or "location", then the suggestion module 110 may increase the row score and the column score by some amount (e.g., ten points) and decrease the value scores by some amount (e.g., ten points).

If the name of the field matches the keywords "date", "month", "day", "week," or "year", then the suggestion module 110 may decrease the row score and the value scores by some embodiment (e.g., ten points) and increase the column score by some amount (e.g., ten points). If the name of the field matches the keywords "city", "state", and "country", then the suggestion module 110 may increase the row score and the column score by some amount (e.g., ten points) and decrease the value scores by some amount (e.g., ten points). If the name of the field matches the keywords "name" or "manager", then the suggestion module 110 may increase the row score and the column score by some amount (e.g., ten points) and decrease the value scores by some amount (e.g., ten points).

It should be appreciated that when the spreadsheet document 112 contains a large number of rows greater than pre-defined threshold, the suggestion module 110 may be configured to perform a sampling process. The sampling process may reduce the quantity of rows evaluated by the suggestion module 110 when generating the field scores. The sampling process may utilize a deterministic sampling that aims to minimize bias in rows selected for generating the suggestion. Additional details regarding the sampling process are described below. When the suggestion module 110 determines field scores for each field in the spreadsheet document 112, the routine 200 may proceed to operation 204.

At operation 204, the suggestion module 110 may adjust the individual field scores based on user selection of specific fields. A user may provide an indication as to the importance of one or more specific fields by selecting the fields via the data summary interface 108. For example, the spreadsheet document 112 may include a "country" field among other various fields. The data summary interface 108 may request that the user select one of the fields as a starting point. If the user selects the "country" field, then the suggestion module 110 may increase the field score (e.g., multiply the field score by two) corresponding to the "country" field. In this way, the user can ensure through the selection a higher probability that the "country" field will appear in the suggested field sets 118. When the suggestion module 110 adjusts the individual field scores based on user selection of specific fields, the routine 200 proceeds to operation 206.

At operation 206, the suggestion module 110 may generate a hierarchical mapping. A hierarchical mapping may define an order of the row labels and/or the column labels in each of the suggested field sets 118. The suggestion module 110 may determine the hierarchical mapping based on the names of the fields in the spreadsheet document 112. In some embodiments, the mappings between certain fields may be pre-defined by the suggestion module 110 and/or by the user. In some other embodiments, the suggestion module 110 may identify mappings by analyzing relationships between fields.

For example, a set of cities listed in one column associated with a state listed in another column may indicate a hierarchy where the state is the parent and the set of cities are the children. In this example, the hierarchical mapping may define that the state is arranged before the set of cities in the row labels and/or the column labels. The suggestion module 110 may determine such mapping between a state and cities by performing a quick check and/or a deep check. In some embodiments, the deep check may follow the quick check if the quick check passes. During the quick check, the suggestion module 110 may verify whether the quantity of cities is greater than the quantity of states. The greater number of cities may indicate a hierarchy where the state is the parent and the cities are the children. During the deep check, the suggestion module 110 may verify whether a one-way mapping exists from cities to the state. For example, each instance (or a vast majority of instances) of Portland may map to Oregon state. However, each instance of Oregon may not map only to Portland but also to other cities, such as Eugene, Salem, and Corvallis.

A first example hierarchical mapping may specify the following hierarchy from top to bottom of a conceptual tree structure: year→month→week→date/day. A second example hierarchical mapping may specify the following hierarchy from top to bottom of a conceptual tree structure: country→state→city. A third example hierarchical mapping may specify the following hierarchy from top to bottom of a conceptual tree structure: manager→name. When the suggestion generates the hierarchical mapping, the routine 200 proceeds to operation 208.

At operation 208, the suggestion module 110 may generate potential field sets based on the individual field scores and the hierarchical mapping. The suggestion module 110 may be adapted to generate a set number of potential field sets (e.g., ten potential field sets). When generating the first few potential field sets (e.g., the first two potential field sets), the suggestion module 110 may generate a simple field set. As used herein, a "simple field set" may refer to a field set that contains row labels and one value column (e.g., a sum column, a count column, an average column, etc.). The simple field set may not contain column labels. For the remaining potential field sets, the suggestion module 110 may generate a normal field set. As used herein, a "normal field set" may refer to a field set that contains row labels, optionally column labels, and one or more value columns.

When generating the simple field set, the suggestion module 110 may temporarily disregard the column scores because the simple field set does not contain column labels. In particular, the suggestion module 110 may select a first field having the highest row score and second field having the highest value score. In an illustrative example, the spreadsheet document 112 may contain multiple rows where each row identifies a sales transaction. The spreadsheet document 112 may include a "customer name" field identifying the name of the customer in each transaction and a "quantity" field identifying the quantity of products sold during each transaction.

In this example, the "customer name" field may have the highest row score, and a sum score for a "quantity" field may be the highest value score. As a result, the suggestion module 110 may generate a potential field set containing multiple row labels corresponding to the "customer name" field and a sum column corresponding to the "quantity" field. In particular, each of the row labels may specify a unique customer name. The sum column may include multiple summary cells, where each summary cell contains a sum of the quantities of products sold to the customer associated with the corresponding customer name throughout the transactions. Here, the potential field set may aggregate the transactions listed in the spreadsheet document 112 and organize the aggregated transactions by customer name along with the quantities of products sold to each customer.

When generating each successive field set, the suggestion module 110 may be configured to perform a check to ensure that the field set has not been previously suggested. To determine if the field set has been previously suggested, the suggestion module 110 may compare the row fields, column fields, and the value fields of the current field set with the row fields, column fields, and the value fields of previously suggested field sets. During the comparison, the suggestion module 110 may also ensure that row fields and column fields have not merely been swapped from the previously suggested field sets. For example, an illustrative current field set may include a row field associated with a first field, column field associated with a second field, and a value field associated with a third field. Here, the suggestion module 110 may determine that a previously suggested field set may include a row field associated with the second field, a column field associated with the first field, and a value field associated with the third field. Thus, the suggestion module 110 may be configured to discard the illustrative current field set because the illustratively current field set has merely swapped the row field and the column field from the previously suggested field set.

As the suggestion module 110 generates each field set, the suggestion module 110 may reduce the field scores of the fields that the suggestion module 110 previously utilized. In the previous example, the suggestion module 110 may reduce the row score for the "customer name" field and the sum score for the "quantity" field by multiplying the scores by some constant (e.g., 0.75). In this way, the suggestion module 110 is less likely to choose the same fields when generating additional potential field sets. Rather, the suggestion module 110 becomes more likely to choose higher scoring fields, thereby providing greater variety to the user. In addition to providing greater variety to the user, the lowering of the field scores for previously utilized fields may ensure that two or more fields having the same scores are each considered. Further, the gradual lowering of the field scores by some constant may ensure that if a better candidate field has a much higher score than other worse candidate fields, the better candidate field is considered multiple times before a worse candidate field is considered.

In addition to reducing the field scores of previously utilized fields, the suggestion module 110 may also maintain a usage count of the number of times each field is utilized in a field set. When the usage count reaches a maximum threshold (e.g., three times), the suggestion module 110 may be configured to ignore the field until each eligible field has be exhausted. For example, when each eligible row field has been exhausted, the suggestion module 110 may reset the usage counts of the non-eligible row fields back to zero. Similarly, when each eligible column field has been exhausted, the suggestion module 110 may reset the usage counts of the non-eligible column fields back to zero. Further, when each eligible value field has been exhausted, the suggestion module 110 may reset the usage counts of the non-eligible value fields back to zero. The suggestion module 110 may also be configured to perform the reset a limited number of times (e.g., one time).

The process for generating a simple field set may be summarized as follows: (a) selecting the field having the highest row score, (b) selecting the field having the highest value score, (c) generating a potential field set incorporating the selected fields, (d) reducing the field scores for the selected fields, and (e) incrementing the associated usage counts of the selected fields. The suggestion module 110 may be adapted to repeat the above process until the set number of simple field sets has been generated. The suggestion module 110 may arrange the row labels in each simple field set according to the hierarchical mapping.

Additionally, the suggestion module 110 may be adapted to disregard any repeating field sets. The suggestion module 110 may also be adapted to prioritize field scores when ties are present. For example, when multiple field scores are equivalent, the suggestion module 110 may adhere to the following prioritization sequence from highest priority to lowest priority: row score→column score→sum score→count score→average score. The suggestion module 110 may further be adapted to resolve multiple selections of the same field. For example, a given field may have the highest score in more than one field score, which may cause the suggestion module 110 to select the same field more than once. In this case, when multiple field scores for a given field are the highest, the suggestion module 110 may adhere to the following prioritization sequence from highest priority to lowest priority: row score→column score→sum score→count score→average score. When the suggestion module 110 completes generating the simple field sets, the suggestion module 110 may proceed to generating the normal field sets.

When generating the normal field sets, the suggestion module 110 may operate similarly to when it generates the simple field sets, except the suggestion module 110 may consider the row scores and column scores, as well as more than one value score. In order to keep the field sets compact, the suggestion module 110 may be adapted to consider column scores only when the column scores are greater than the row scores. The suggestion module 110 may consider more than one value score depending on the particular implementation as well as preferences of the suggestion module 110 and/or the user. For the sake of simplicity, the suggestion module 110 may consider a single value score in some examples described herein.

The process for generating a normal field set may be summarized as follows: (a) selecting the field having the highest row score, (b) selecting the field having the highest column score if the highest column score is greater than the highest row score, (c) selecting one or more fields having the highest value scores, (d) generating a field set incorporating the selected fields, and (e) reducing the field scores for the selected fields. The suggestion module 110 may be adapted to repeat the above process until the set number of normal field sets has been generated. The suggestion module 110 may arrange the row labels and the column labels in each normal field set according to the hierarchical mapping. When the suggestion module 110 generates the potential field sets based on the field scores and the hierarchical mapping, the routine 200 may proceed to operation 210.

At operation 210, the suggestion module 110 may perform a post-generation quality check for each potential field set. The suggestion module 110 may be adapted to perform the post-generation quality check as each potential field set is generated. If a potential field set passes the post-generation quality check, then the suggestion module 110 may include the potential field set in the suggested field sets 118. If the potential field set does not pass the post-generation quality check, then the suggestion module 110 may discard the potential field set as unacceptable. The post-generation quality check can ensure that the suggested field sets 118 contain good suggestions for the user.

According to various embodiments, the post-generation quality check may include a shape check, a compactness check, and/or a density check. During the shape check, the suggestion module 110 may analyze the width-to-height ratio of a potential field set. The suggestion module 110 may be adapted to accept potential field sets that do not have extreme variations in the width-to-height ratio. For example, if the width-to-height ratio of potential field set is less than about 0.1 or greater than about six, then the suggestion module 110 may reject the potential field set. In this example, the suggestion module 110 may accept those potential field sets having a width-to-height ratio between about 0.1 and six.

During the compactness check, the suggestion module 110 may analyze the number of rows and the number of columns in a potential field set. If the potential field set has an excessively low number of rows, then the generated field set may not provide enough information to the user. If the potential field set has an excessive high number of rows and/or an excessively high number of columns, then the summarized data may be too much for a user to analyze. Further, the potential field set may not even fit on some screen displays. The suggestion module 110 may discard potential field sets containing an excessively low number of rows (e.g., less than or equal to two), an excessively high number of rows (e.g., greater than forty), and/or an excessively high number of columns (e.g., greater than ten). The suggestion module 110 may accept potential field sets within a proper range of rows (e.g., between three and forty) and within a proper range of columns (e.g., ten or fewer).

During the density check, the suggestion module 110 may analyze the number of empty cells in a potential field set. Each summary cell in the potential field set may or may not contain values. If a potential field set has an excessive number of empty cells, then the suggestion module 110 may discard the potential field set. In this case, the sparse data contained in the potential field set may not provide good insight to the user. If a potential field set has a number of empty cells less than the excessive number, then the suggestion module 110 may accept the potential field set. For example, the suggestion module 110 may discard potential field sets where the number of empty cells is greater than about 20% of the total number of summary cells. The suggestion module 110 may accept other potential field sets where the number of empty cells is less than or equal to about 20% of the total number of summary cells. When the suggestion module 110 performs the post-generation quality check for each generated field set, the routine 200 may either repeat (e.g., periodically, continuously, or on demand as needed) or terminate.

FIG. 3 is a screen display diagram illustrating a portion of an example spreadsheet document 300, in accordance with some embodiments. The spreadsheet document 300 may be an example implementation of the spreadsheet document 112. The first twenty rows of the spreadsheet document 300 are illustrated in FIG. 3, as displayed by the spreadsheet interface 106. The spreadsheet document 300 may arrange raw data associated with fruit sales over a period of time. Each row in the spreadsheet document 300 may represent a sales transaction of some quantity of one fruit to a customer on a given date. The spreadsheet document 300 may include a sale ID column 302, a date column 304, a customer column 306, a product column 308, a quantity column 310, a price column 312, a fruit column 314, a farm column 316, and an organic column 318.

The sale ID column 302 may include multiple cells, each of which contains an identifier corresponding to each sale. In this example, the identifier is incremented by one as each sale was made. The sale ID column 302 may represent a "sale ID" field. The date column 304 may include multiple cells, each of which contains a date when each sale was made. The date column 304 may represent a "date" field. The customer column 306 may include multiple cells, each of which contains a name of the customer who made each fruit purchase. The customer column 306 may represent a "customer" field. The product column 308 may include multiple cells, each of which contains a name of the fruit purchased by each customer. The product column 308 may represent a "product" field.

The quantity column 310 may include multiple cells, each of which contains a quantity of the fruit purchased by each customer. The quantity column 310 may represent a "quantity" field. The price column 312 may include multiple cells, each of which contains an amount of money paid by each customer to purchase the quantity of fruit. The price column 312 may represent a "price" field. The fruit column 314 may include multiple cells, each of which contains the category of fruit purchased by each customer. The fruit column 314 may represent a "fruit" field. The farm column 316 may include multiple cells, each of which contains the farm that sources the fruit purchased by each customer. The farm column 316 may represent a "farm" field. The organic column 318 may include multiple cells, each of which contains a Boolean value (i.e., true or false) indicating whether the fruit purchased by each customer is organic or non-organic. The organic column 318 may represent an "organic" field.

As illustrated in FIG. 3, the amount of raw data contained in the spreadsheet document 300 can be challenging and frustrating for a user to manually analyze, especially when the spreadsheet document 300 contains hundreds of, thousands of, or even more rows. In this regard, the user may select the interface element 124 in the spreadsheet interface 106 in order to launch the data summary interface 108. When the user launches the data summary interface 108, the suggestion module 110 may generate the suggested field sets 118. As previously described, the suggested field sets 118 may be utilized in a variety of ways, including for providing suggestions to the user in order to generate the user populated data summary table 116.

In some embodiments, the suggestion module 110 may further be configured to perform a sampling process when the spreadsheet document 112 contains a large number of rows (e.g., greater than 5000). In such cases, the suggestion module 110 may sample the data in order to improve performance. The sampling process may utilize a deterministic sampling that aims to minimize bias in rows selected for generating the suggestion.

In an example implementation, the sampling process may operate as follows. For N number of rows in the spreadsheet document 112 and a threshold of 5000 rows, the suggestion module 110 may compute a result of N/5000 and round down the result to the nearest integer. This rounded down result may be referred to as a "step size." The suggestion module 110 may select the first row. The suggestion module 110 may then incrementally select the (1+step size)th row, the (1+2*step size)th row, the (1+3*step size)th row, and so forth until the suggestion module 110 has collected the 5000 rows. For example, if N=10000 which results in a step size of two, then the selected rows may include the first row, the third row, the fifth row, and so forth. When the appropriate rows have been selected, the suggestion module 110 may generate the field scores for the selected rows.

In some embodiments, the suggestion module 110 may further be configured to generate a frequency table when a selection contains only one column (i.e., field) from the spreadsheet document 112. The frequency table may be generated in addition to the regularly suggested field sets. As used herein, a "frequency table" may refer to a pivot table that includes a row value of the selected field and a value field corresponding to a count of the selected field. For example, using the spreadsheet document 300, the suggestion module 110 may select only the "customer" field. Here, the suggestion module 110 may generate a frequency table that describes the number of purchases that were made by each customer, e.g., Dave—5, Cathy—5, Ellen—1, Adam—4, and Barry—5.

Figure 4A:
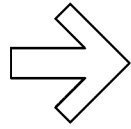
FIGS. 4A-4D are diagrams illustrating an example sequence of potential field sets that are generated by a suggestion module, in accordance with some embodiments.

FIGS. 4A-4D are diagrams illustrating an example sequence of potential field sets that are generated by the suggestion module 110, in accordance with some embodiments. FIG. 4A illustrates a table 402A that contains the highest field scores corresponding to each of the fields contained in the spreadsheet document 300. The table 402A includes a row score column 404, a column score column 406, a sum score column 408, a count score column 410, and an average score column 412. The row score column 404 may list the highest row scores for various fields identified in parentheses. The column score column 406 may list the highest column scores for various fields identified in parentheses. The sum score column 408 may list in the highest sum scores for various fields identified in parentheses. The count score column 410 may list the highest count scores for various fields identified in parentheses. The average score column 412 may list the highest average scores for various fields identified in parentheses.

In this example, the suggestion module 110 may be adapted to generate two simple field sets. Upon generating the two simple field sets, the suggestion module 110 may be adapted to generate a set number of normal field sets. When generating the simple field sets, the suggestion module 110 may temporarily disregard the column score column 406. The suggestion module 110 may select the highest row score in the row score column 404 and the highest value score between the sum score column 408, the count score column 410, and the average score column 412.

In the table 402A, the highest row score is the fifty points associated with the "customer" field, and the highest value score is the thirty points associated with the "quantity" field for the sum score. As a result, the suggestion module 110 may generate a first potential field set 414A incorporating the selected "customer" field and the selected "quantity" field. In particular, the first potential field set 414A may include multiple row labels 416A-416E, each of which corresponds to a unique customer name in the "customer" field. The first potential field set 414A may also include a sum column 418. Summary cells 420A-420E in the sum column 418 may each contain a computation result of the sum of the quantities of fruit purchased corresponding to each customer name. The first potential field set 414A may further include a grand total portion 422.

When the suggestion module 110 generates the first potential field set 414A, the suggestion module 110 may reduce the field scores associated with the selected fields. In particular, the fifty points associated with the "customer" field may be multiplied by 0.75 which results in thirty-seven points. Additionally, the thirty points associated with the "quantity" field for the sum score may be multiplied by 0.75 which results in twenty-two points. The updated field scores are reflected in FIG. 4B.

Figure 4B:
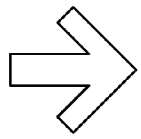

FIG. 4B illustrates a table 402B that contains the highest field scores corresponding to each of the fields contained in the spreadsheet document 300 after generating the first potential field set 414A and reducing the corresponding field scores. The suggestion module 110 may be adapted to generate another simple field set. As a result, the suggestion module 110 may select the highest row score in the row score column 404 and the highest value score between the sum score column 408, the count score column 410, and the average score column 412.

In the table 402B, the highest row score is the fifty points associated with the "fruit" field, and the highest value score is the thirty points associated with the "price" field for the sum score. As a result, the suggestion module 110 may generate a second potential field set 414B incorporating the selected "fruit" field and the selected "price" field. In particular, the second potential field set 414B may include multiple row labels 424A-424D, each of which corresponds to a unique fruit category in the "fruit" field. The second potential field set 414B may also include a sum column 426. Summary cells 428A-428D in the sum column 426 may each contain a computation result of the sum of the amounts of money paid by customers for each fruit category. The second potential field set 414B may further include a grand total portion 430.

When the suggestion module 110 generates the second potential field set 414B, the suggestion module 110 may reduce the field scores associated with the selected fields. In particular, the fifty points associated with the "fruit" field may be multiplied by 0.75 which results in thirty-seven points. Additionally, the thirty points associated with the "price" field for the sum score may be multiplied by 0.75 which results in twenty-two points. The updated field scores are reflected in FIG. 4C.

Figure 4C:
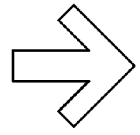

FIG. 4C illustrates a table 402C that contains the highest field scores corresponding to each of the fields contained in the spreadsheet document 300 after generating the second potential field set 414B and reducing the corresponding field scores. Because the suggestion module 110 has generated two simple field sets, the suggestion module 110 may be adapted to generate a set number of normal field sets. As a result, the suggestion module 110 may select the highest row score in the row score column 404, the highest column score in the column score column 406, and the highest value score between the sum score column 408, the count score column 410, and the average score column 412.

In the table 402C, the highest row score is the fifty points associated with the "farm" field, the highest column score is the forty points associated with the "organic" field, and the highest value score is the thirty points associated with the "sale ID" field for the count score. The highest column score (i.e., forty points) is not higher than the highest row score (i.e., fifty points). As a result, the suggestion module 110 may disregard the highest column score and generate a third potential field set 414C incorporating the selected "farm" field and the selected "sale ID" field. In particular, the third potential field set 414C may include multiple row labels 432A-432D, each of which corresponds to a unique farm in the "farm" field. The third potential field set 414C may also include a count column 434. Summary cells 436A-436D in the count column 434 may each contain a computation result of the count of identifiers associated with each farm. The third potential field set 414C may further include a grand total portion 438.

When the suggestion module 110 generates the third potential field set 414C, the suggestion module 110 may reduce the field scores associated with the selected fields. In particular, the fifty points associated with the "farm" field may be multiplied by 0.75 which results in thirty-seven points. Additionally, the thirty points associated with the "sale ID" field for the count score may be multiplied by 0.75 which results in twenty-two points. The updated field scores are reflected in FIG. 4D.

Figure 4D:
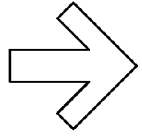

FIG. 4D illustrates a table 402D that contains the highest field scores corresponding to each of the fields contained in the spreadsheet document 300 after generating the third potential field set 414C and reducing the corresponding field scores. The suggestion module 110 may be adapted to generate another normal field set. As a result, the suggestion module 110 may select the highest row score in the row score column 404, the highest column score in the column score column 406, and the highest value score between the sum score column 408, the count score column 410, and the average score column 412.

In the table 402D, the highest row score is the thirty-seven points associated with the "customer" field, the highest column score is the forty points associated with the "organic" field, and the highest value score is the twenty-two points associated with the "quantity" field for the sum score. The highest column score (i.e., forty points) is higher than the highest row score (i.e., thirty-seven points). As a result, the suggestion module 110 may generate a fourth potential field set 414D incorporating the selected "customer" field, the selected "organic" field, and the selected "quantity" field. In particular, the fourth potential field set 414D may include multiple row labels 440A-440E, each of which corresponds to a unique customer in the "customer" field. The fourth potential field set 414D may also include two column labels, a false column 442A and a true column 442B, corresponding to the Boolean values in the "organic" field. The fourth potential field set 414D may further include a sum column 444.

Summary cells 446A-446E in the false column 442A may each contain a computation result of the sum of the quantities of non-organic fruit purchased corresponding to each customer name. Summary cells 448A-448E in the true column 442B may each contain a computation result of the sum of the quantities of organic fruit purchased corresponding to each customer name. Summary cells 450A-450E in the sum column 444 may each contain a computation result of the sum of the quantities of fruit (i.e., organic and non-organic) purchased corresponding to each customer name. The fourth potential field set 414D may further include a grand total portion 452.

When the suggestion module 110 generates the fourth potential field set 414D, the suggestion module 110 may reduce the field scores associated with the selected fields. In particular, the thirty-seven points associated with the "customer" field may be multiplied by 0.75 which results in twenty-eight points. Additionally, the forty points associated with the "organic" field may be multiplied by 0.75 which results in thirty points. Further, the twenty-two points associated with the "quantity" field for the sum score may be multiplied by 0.75 which results in seventeen points. The above-described process for generating normal field sets may be repeated until the set number of normal field sets has been generated.

Figure 5:
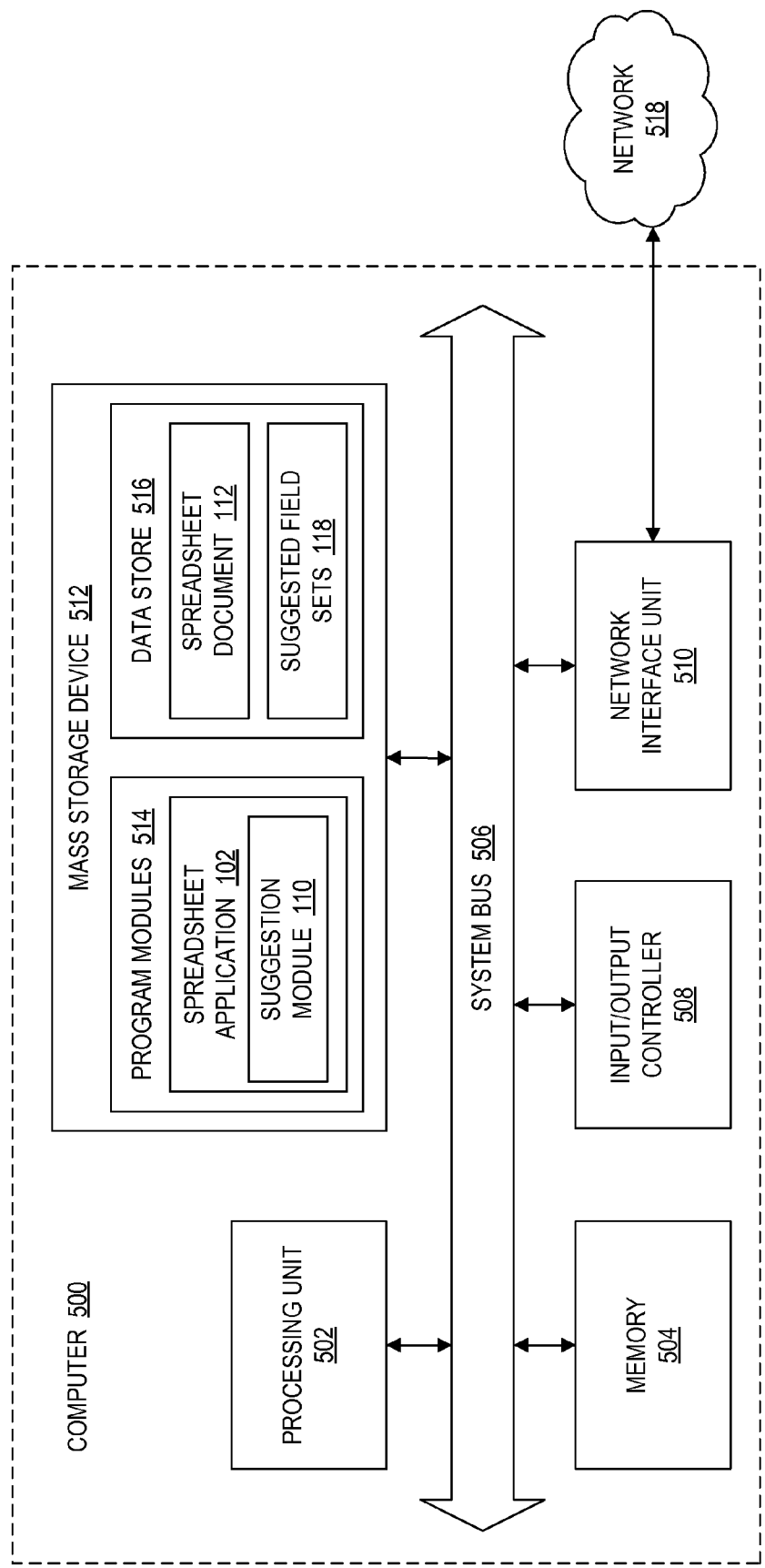
FIG. 5 is a computer architecture diagram showing an illustrative computer hardware architecture for a computing system capable of implementing the embodiments presented herein.

FIG. 5 is an example computer architecture diagram illustrating a computer 500. Examples of the computer 500 may include the computing system 100. The computer 500 may include a central processing unit 502, a system memory 504, and a system bus 506 that couples the memory 504 to the central processing unit 502. The computer 500 may further include a mass storage device 512 for storing one or more program modules 514 and a data store 516. An example of the program modules 514 may include the spreadsheet application 102 adapted to further include the suggestion module 110. The data store 516 may store the spreadsheet document 112 and the suggested field sets 118 generated by the suggestion module 110. The mass storage device 512 may be connected to the processing unit 502 through a mass storage controller (not shown) connected to the bus 506. The mass storage device 512 and its associated computer-storage media may provide non-volatile storage for the computer 500. Although the description of computer-storage media contained herein refers to a mass storage device, such as a hard disk or CD-ROM drive, it should be appreciated by those skilled in the art that computer-storage media can be any available computer storage media that can be accessed by the computer 500.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 518. The computer 500 may connect to the network 518 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

The bus 506 may enable the processing unit 502 to read code and/or data to/from the mass storage device 512 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 514 may include software instructions that, when loaded into the processing unit 502 and executed, cause the computer 500 to generate field sets. The program modules 514 may also provide various tools or techniques by which the computer 500 may participate within the overall systems or operating environments using the components, flows, and data structures discussed throughout this description. For example, the program modules 514 may implement interfaces for generating field sets.

In general, the program modules 514 may, when loaded into the processing unit 502 and executed, transform the processing unit 502 and the overall computer 500 from a general-purpose computing system into a special-purpose computing system customized to generate field sets. The processing unit 502 may be constructed from any number of transistors or other discrete circuit elements, which may individually or collectively assume any number of states. More specifically, the processing unit 502 may operate as a finite-state machine, in response to executable instructions contained within the program modules 514. These computer-executable instructions may transform the processing unit 502 by specifying how the processing unit 502 transitions between states, thereby transforming the transistors or other discrete hardware elements constituting the processing unit 502.

Encoding the program modules 514 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 514 may transform the physical state of the semiconductor memory, when the software is encoded therein. For example, the program modules 514 may transform the state of transistors, capacitors, or other discrete circuit elements constituting the semiconductor memory.

As another example, the computer-storage media may be implemented using magnetic or optical technology. In such implementations, the program modules 514 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for generating field sets of a data summary table are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for generating field sets of a data summary table, the method comprising computer-implemented operations for:
    identifying a plurality of fields in a spreadsheet document;
    determining a plurality of field scores for each field of the plurality of fields;
    generating a field set incorporating two or more of the plurality of fields based on the plurality of field scores by generating a simple field set and generating a normal field set; and
    inserting the field set into the data summary table, thereby transforming the data summary table without the field set to the data summary table with the field set.

2. The computer-implemented method of claim 1, wherein determining the plurality of field scores for each of the plurality of fields comprises:
    determining a row score, a column score, and a value score for each of the plurality of fields.

3. The computer-implemented method of claim 2, wherein determining the row score, the column, score and the value score for each of the plurality of fields comprises:
    for each field of the plurality of fields,
        determining a number of empty cells under the field,
        adjusting the row score for the field by a first amount based on the number of empty cells under the field,
        adjusting the column score for the field by a second amount based on the number of empty cells under the field, and
        adjusting the value score for the field by a third amount based on the number of empty cells under the field.

4. The computer-implemented method of claim 2, wherein determining the row score, the column score and the value score for each of the plurality of fields comprises:
    for each field of the plurality of fields,
        determining a data type associated each value under the field,
        adjusting the row score for the field by a first amount based on the data type of each value under the field,
        adjusting the column score for the field by a second amount based on the data type of each value under the field, and
        adjusting the value score for the field by a third amount based on the data type of each value under the field.

5. The computer-implemented method of claim 2, wherein determining the row score, the column, score and the value score for each of the plurality of fields comprises:
    for each field of the plurality of fields,
        determining whether a name of the field matches a keyword,
        adjusting the row score for the field by a first amount when the name of the field matches the keyword,
        adjusting the column score for the field by a second amount when the name of the field matches the keyword, and
        adjusting the value score for the field by a third amount when the name of the field matches the keyword.

6. The computer-implemented method of claim 2, wherein generating the simple field set comprises:
    selecting a first highest scoring field of the plurality of fields having the highest row score;
    selecting a second highest scoring field of the plurality of fields having the highest value score;
    generating the simple field set having a plurality of row labels corresponding to the first highest scoring field and a value column corresponding to the second highest scoring field, the value column comprising a plurality of cells, each of the plurality of cells corresponding to one of the plurality of row labels, each of the plurality of cells containing a computation result of a mathematical result corresponding to one of the plurality of row labels;
    reducing the first highest scoring field and the second highest scoring field; and
    incrementing a first usage count associated with the first highest scoring field and a second usage count associated with the second highest scoring field.

7. The computer-implemented method of claim 2, wherein generating the normal field set comprises:
    selecting a first highest scoring field of the plurality of fields having the highest row score;
    selecting a second highest scoring field of the plurality of fields having the highest column score;
    selecting a third highest scoring field of the plurality of fields having the highest value score;
    determining whether the second highest scoring field is greater than the first highest scoring field;
    in response to determining that the second highest scoring field is not greater than the first highest scoring field,
        generating the normal field set having a plurality of row labels corresponding to the first highest scoring field and a value column corresponding to the third highest scoring field, the value column comprising a first plurality of cells, each of the first plurality of cells corresponding to one of the plurality of row labels, each of the first plurality of cells containing a computation result of a mathematical function and corresponding to one of the plurality of row labels,
        reducing the first highest scoring field and the third highest scoring field, and
        incrementing a first usage count associated with the first highest scoring field and a third usage count associated with the third highest scoring field; and
    in response to determining that the second highest scoring field is greater than the first highest scoring field,
        generating the normal field set having the plurality of row labels corresponding to the first highest scoring field, a plurality of column labels corresponding to the second highest scoring field, and the value column corresponding to the third highest scoring field, the plurality of column labels comprising a first column label and a second column label, the first column label associated with a first additional column in the normal field set and the second column label associated with a second additional column in the normal field set, the first additional column comprising a second plurality of cells, the second plurality of cells corresponding to one of the plurality of row labels and the first column label, each of the second plurality of cells containing a computation result of the mathematical function and corresponding to one of the plurality of row labels and the first column label, the second additional column comprising a third plurality of cells, the third plurality of cells corresponding to one of the plurality of row labels and the second column label, each of the third plurality of cells containing a computation result of the mathematical function and corresponding to one of the plurality of row labels and the second column label, reducing the first highest scoring field, the second highest scoring field, and the third highest scoring field, and incrementing the first usage count associated with the first highest scoring field, a second usage count associated with the second highest scoring field, and the third usage count associated with the third highest scoring field.

8. The computer-implemented method of claim 7, further comprising computer-implemented operations for:
generating a hierarchical mapping for the plurality of row labels and the plurality of column labels;
arranging an order of the plurality of row labels in the normal field set in accordance with the hierarchical mapping; and
arranging an order of the plurality of column labels in the normal field set in accordance with the hierarchical mapping.

9. The computer-implemented method of claim 1, wherein generating the field set incorporating two or more of the plurality of fields based on the plurality of field scores comprises:
determining whether the field set fails a quality check; and
in response to determining that the field set fails the quality check, discarding the field set.

10. The computer-implemented method of claim 9, wherein determining whether the field set fails the quality check comprises:
determining whether the field set has either a low width-to-height ratio below a first threshold or a high width-to-height ratio above a second threshold; and
in response to determining that the field has either the low width-to-height ratio below the first threshold or the high width-to-height ratio above the second threshold, determining that the field set fails the quality check.

11. The computer-implemented method of claim 9, wherein determining whether the field set fails the quality check comprises:
determining whether the field set has either a low number of rows below a first threshold, a high number of rows above a second threshold, or a high number of columns above a third threshold; and
in response to determining that the field set has either the low number of rows below the first threshold, the high number of rows above the second threshold, or the high number of columns above the third threshold, determining that the field set fails the quality check.

12. The computer-implemented method of claim 9, wherein determining whether the field set fails the quality comprises:
determining whether the field set has a high number of empty cells above a threshold; and
in response to determining that the field set has the high number of empty cells above the threshold, determining that the field set fails the quality check.

13. The computer-implemented method of claim 2, further comprising computer-implemented operations for:
receiving a user selection of a field in the plurality of fields; and
upon receiving the user selection of the field, increasing a field score in the plurality of field scores corresponding to the field.

14. The computer-implemented method of claim 1, further comprising computer-implemented operations for:
determining whether a quantity of rows in the spreadsheet document is greater than a threshold; and
in response to determining that the quantity of rows in the spreadsheet document is greater than the threshold, performing a sampling process adapted to reduce the quantity of rows in the spreadsheet document evaluated when determining the field scores.

15. The computer-implemented method of claim 1, further comprising computer-implemented operations for:
identifying a single field from the plurality of fields; and
generating a frequency table containing a plurality of row labels corresponding to the single field and a single column containing a plurality of cells, each of the plurality of cells corresponding to one of the plurality of row labels and containing a computation result of a count function.

16. A computer-readable storage medium having computer-executable instructions stored thereon which, when executed by a computer, cause the computer to:
identify a plurality of fields in a spreadsheet document;
determine a plurality of field scores for each field of the plurality of fields;
generate a field set incorporating two or more of the plurality of fields based on the plurality of field scores;
determine whether the field set fails a quality check comprising at least a density check;
discard the field set when the field set fails the quality check; and
insert the field set into a data summary table when the field set does not fail the quality check, thereby transforming the data summary table without the field set to the data summary table with the field set.

17. The computer-readable storage medium of claim 16, wherein the field set comprises a plurality of row labels and at least one of a plurality of value columns, the plurality of value columns comprising a sum column, a count column, and an average column, the sum column comprising a first plurality of cells, each of the first plurality of cells containing a computation result of a sum function and corresponding to one of the plurality of row labels, the count column comprising a second plurality of cells, each of the second plurality of cells containing a computation result of a count function and corresponding to one of the plurality of row labels, the average column comprising a third plurality of cells, each of the third plurality of cells containing a computation result of an average function and corresponding to one of the plurality of row labels.

18. The computer-readable storage medium of claim 16, wherein the quality check comprises a shape check, a compactness check, and the density check.

19. A computer system, comprising:
- a processor;
- a memory communicatively coupled to the processor; and
- a program module which executes in the processor from the memory and which, when executed by the processor, causes the computer system to:
  - identify a plurality of fields in a spreadsheet document;
  - determine a plurality of field scores for each field of the plurality of fields, the plurality of field scores including a row score, a column score, a sum score, a count score, and an average score;
  - generate a field set incorporating two or more of the plurality of fields based on the plurality of field scores;
  - determine whether the field set fails a quality check;
  - discard the field set when the field set fails the quality check; and
  - insert the field set into a data summary table when the field set does not fail the quality check, thereby transforming the data summary table without the field set to the data summary table with the field set.

20. The computer system of claim 19, wherein the quality check comprises a shape check, a compactness check, and a density check.

* * * * *